July 29, 1924.
J. F. ARCHER
1,503,103
AUTOMOBILE SIGNAL
Filed Sept. 10, 1923 2 Sheets-Sheet 1
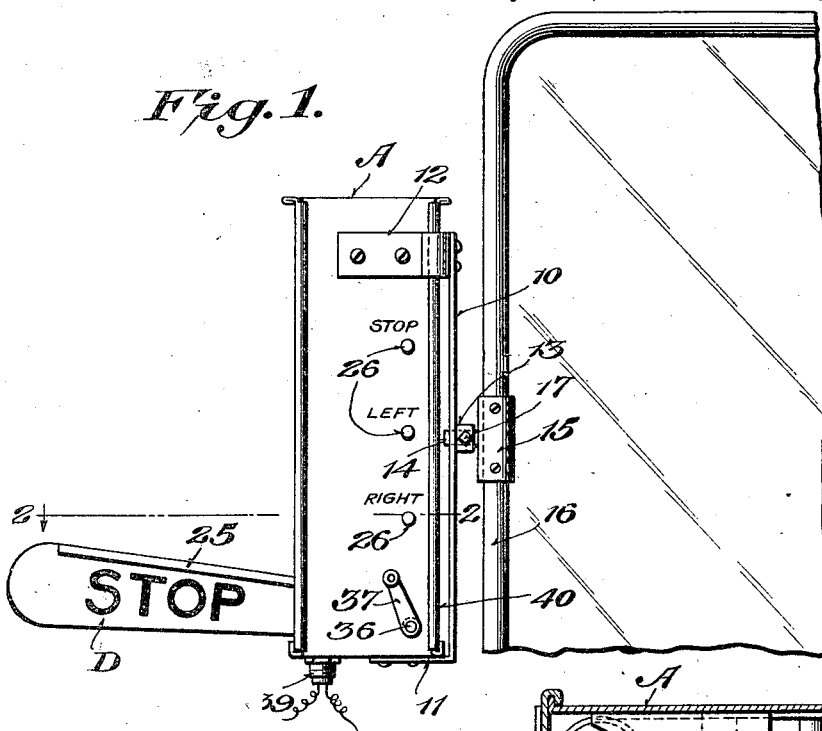
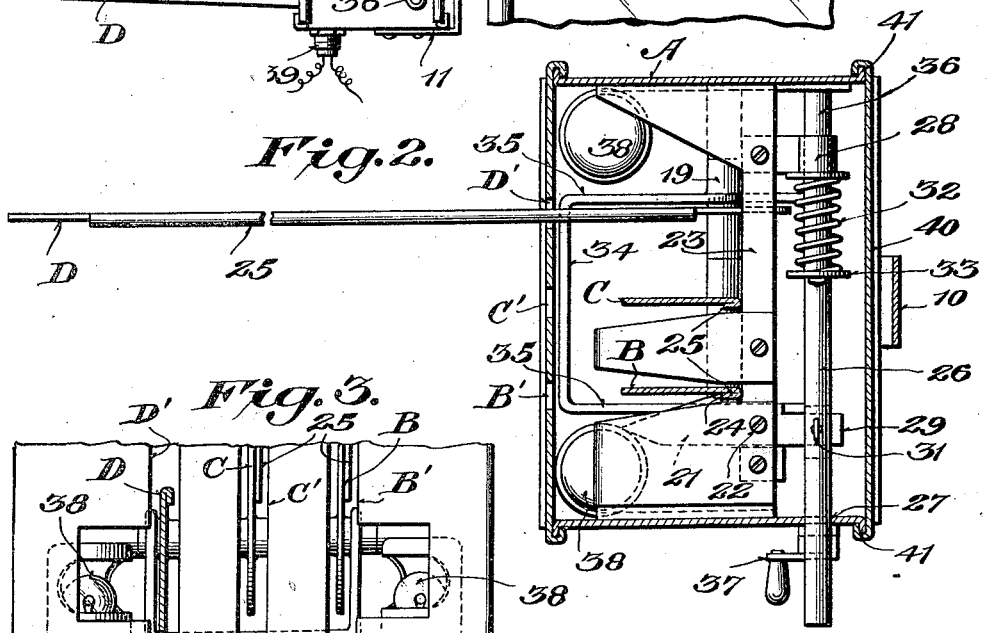
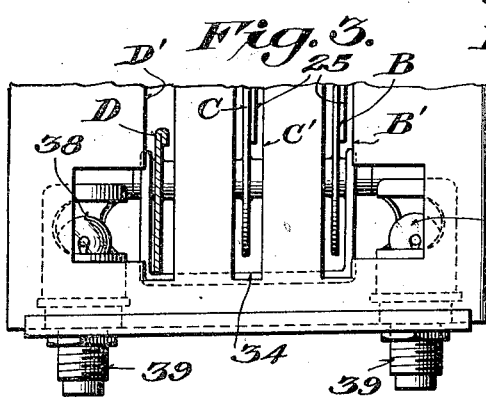
Inventor
J. F. Archer,
By Hubard & Hubard,
his Attorneys
WITNESS:—
Chas. L. Griesbauer July 29, 1924.  
J. F. ARCHER  
1,503,103  
AUTOMOBILE SIGNAL  
Filed Sept. 10, 1923   2 Sheets-Sheet 2
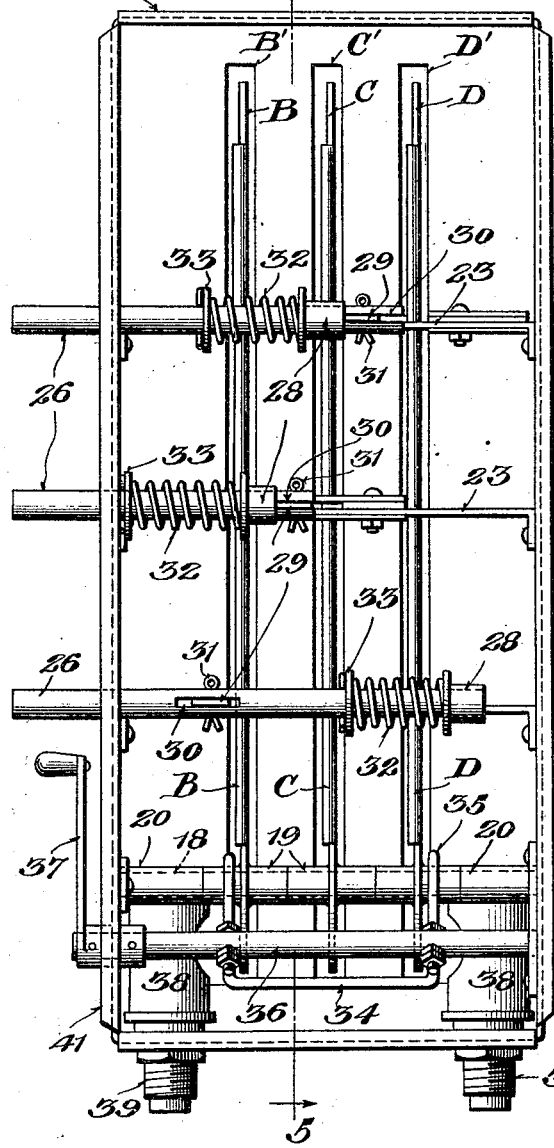
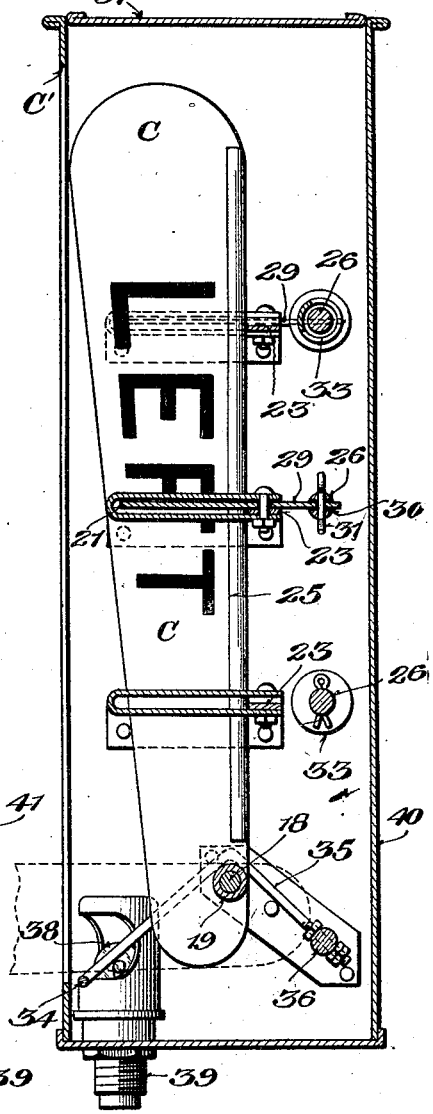
Inventor  
J. F. Archer Patented July 29, 1924.

1,503,103

UNITED STATES PATENT OFFICE.

JOHN F. ARCHER, OF TRINIDAD, COLORADO.

AUTOMOBILE SIGNAL.

Application filed September 10, 1923. Serial No. 661,980.

*To all whom it may concern:*

Be it known that I, JOHN F. ARCHER, a citizen of the United States, residing at Trinidad, in the county of Las Animas and State of Colorado, have invented new and useful Improvements in Automobile Signals, of which the following is a specification.

This invention relates to automobile signals for indicating changes in direction and also that the automobile is coming to a stop, and the object of the invention is to provide for conveniently controlling signal arms or semaphores so as to maintain them housed in a casing when not in use and for selectively bringing them into exposed and operative positions in a very simple and expeditious manner.

With this and other objects in view, the present invention consists in the combination and arrangement of parts as will be hereinafter described, illustrated in the drawings and particularly pointed out in the claims, it of course being understood that changes in the form, proportion, size, and minor details may be made, within the scope of the claims, without departing from the spirit of sacrificing any of the advantages of the invention.

In the drawings:

Figure 1 is a rear elevation of an automobile signal embodying the features of the present invention and shown applied to a wind shield.

Figure 2 is an enlarged plan section on the line 2—2 of Figure 1.

Figure 3 is a fragmentary front elevation of the bottom portion of the device.

Figure 4 is a rear elevation with the back of the casing removed.

Figure 5 is a vertical sectional view on the line 5—5 of Figure 4.

The operating parts of the present invention are housed within a rectangular casing which is designated generally by the reference character A, and the signal includes a plurality of signal arms or semaphores designated B, C and D which are normally housed in an upright position within the casing, and which are capable of being swung outwardly and downwardly so as to project into an exposed position in a substantially horizontal position as indicated in Figure 1. Means is provided for selectively bringing the signal arms into signaling position, and means is provided for conveniently returning the arms into their normal housed positions.

The casing is mounted in convenient reach of the driver of the automobile, and may be mounted upon a wind shield, as best indicated in Figure 1 of the drawings, wherein 10 designates an upright bracket body spaced slightly from the back of the casing and connected to the bottom of the latter by a suitable horizontal arm 11. At the top of the bracket body there is a yoke 12 which straddles the rear side of the casing and is suitably connected to opposite upright sides thereof. About midway of the length of the bracket 10 there is provided a seat or socket 13 designed to receive a stud or projection 14 extending from a clamp 15 suitably secured to the adjacent upright frame bar 16 of the usual wind shield. A set screw 17 is carried by the seat or socket 13 for engagement with the stud or projection 14 so as to rigidly hold the casing in place. The clamp 15 may be located at any desired position on the wind shield and the casing A may be set at any angle on the stud or pivot 14.

Within the bottom portion of the casing there is a cross bar 18, and the signal arms B, C and D are mounted to swing on this cross bar. Each signal arm is provided near its lower end and in rear of its longitudinal center with a sleeve or hub 19 which rotatably embraces the cross bar 18, the hubs of successive signal arms being arranged in mutual engagement so as to properly space the arms. Washers may be employed between these successive hubs if desired. Suitable spacing sleeves 20 are provided upon the cross bar 18 and disposed between the terminal signal arms and the respective sides of the casing so as to maintain the signal arms in their proper positions within the casing. By mounting each signal arm off center, as best illustrated in Figure 5, it will be understood that the normal tendency of the arm is to gravitate into a substantially horizontal position, and therefore releasable means is provided for normally maintaining the arms upright and within the casing. There is releasable holding mechanism for each signal arm, and as the mechanisms are duplicates in construction and operation, a description of one of them is deemed sufficient.

The releasable holding means for the signal arm B is well shown in Figure 2 and includes a substantially horizontal latch or detent 21 pivoted between its ends as at 22 upon a cross bar 23 which is suitably secured at its ends to the upright sides of the casing A. The pivoted latch or detent is provided with a shoulder or projection 24 which normally engages the front side of a shoulder 25 on the signal arm B, which in the present embodiment is formed by bending or flanging over the rear edge of the signal arm, the latter being formed of sheet metal. The pivoted latch member is controlled by a push rod 26 having its front end working through a bearing opening 27 in one of the sides of the casing and having its inner end slidably mounted in a bearing bracket 28 carried by the cross bar 23. The pivoted latch 21 has a shank portion 29 working in a slot 30 formed in the push rod 26, and there is a suitable pivotal connection 31 between the part 29 and the push rod 26. A coiled spring 32 embraces the push rod 26 and bears at one end against the rotary bearing 28 and at its opposite end against a shoulder 33 on the push rod. Normally the spring 32 is in its expanded condition whereby the push rod 26 is at its outer limit and the latch 21, is held in engagement with the upstanding signal arm B. By pushing inwardly upon the projecting end of the push rod 26, the latch 21 will be rocked out of engagement with the signal arm B, and the latter will gravitate and swing outwardly into the position shown in Figures 1 and 2 for the arm D.

To return the signal arm to its upright housed position there is provided a yoke 34, the cross head portion of which underlies and engages the signal arm in its operative position. As best shown in Figure 5 it will be seen that each side arm 35 of the yoke is in the form of an elbow to hang upon the cross bar 18 so as to stop and support the signal arm in its substantially horizontal operative position. The rear end of each arm 35 is suitably secured to a rock bar 36 disposed below and in rear of the cross bar 18 and suitably mounted in opposite sides of the casing. One end of the rock bar 36 is provided with a crank handle 37 disposed outside of the casing. With the signal arm in its operative position, the crank handle 37 may be employed to rock the bar 36 and through the yoke 34 the signal arm will be returned to its normal upright position. Upon releasing the crank handle 37 the yoke 34 will drop back to its normal position shown in Figure 5 of the drawings. It will of course be understood that the cross head 34 is long enough to underlie all of the signal arms and therefore it is common to the several signal arms and may be employed to return to the upright position which ever signal arm may be in its operative position. It will here be explained that while only three signal arms have been illustrated, any number of arms may be employed.

The signal arms may have suitable inscriptions thereon as for instance the word "Stop" as in Figure 1, and the word "Left" as in Figure 5. The respective push rods 26 may be suitably indicated on the exterior of the casing as indicated in Figure 1 of the drawings in order that the driver may conveniently and selectively release the signal arms and permit them to drop into their operative positions.

It will of course be understood that the front of the casing is provided with vertical slots B', C' and D' to accommodate the signal arms, there being one slot for each signal arm.

For the purpose of illuminating the signal arms in their operative positions, suitable electric lamps 38 are mounted within the bottom portion of the casing in the outer corners thereof, the connections 39 of which extend through the bottom of the casing whereby they may be conveniently connected to the electric lighting system of the automobile.

In order that access may be had to the interior of the casing, the back 40 of the casing is removable and is provided at its opposite upright edges with any suitable form of slidable connection with the opposite sides of the casing whereby it may be drawn upwardly for removal without interfering with the attaching bracket 10.

What I claim is:

1. An automobile signal comprising a plurality of independent signal arms pivoted off center, and capable of gravitating from an upright inoperative position into a displayed position, selective holding means for maintaining each arm in an upright position, each holding means including a latch member and a push device controlling the latch member, and a single means common to the several signal arms for returning them from their operative positions into engagement with the respective holding means.

2. An automobile signal comprising a casing, a plurality of signal arms mounted off center within the casing and adapted to gravitate into operative positions and projecting from the casing, selective releasable holding means for maintaining the arms in upright positions within the casing, each holding means having a control element accessible at the exterior of the casing, a single means common to the several arms for returning them from operative positions into engagement with the holding means and including an operating element accessible at the exterior of the casing.

3. An automobile signal comprising a casing, a signal arm pivoted off center and capable of gravitating from a normal upright position into an operative position, a pivoted latch normally holding the arm in its upright position, and a spring pressed push rod normally holding the latch in engagement with the arm having an actuating portion externally of the casing.

4. An automobile signal comprising a casing, a plurality of signal arms pivoted off center within the casing and adapted to gravitate from upright inoperative positions into operative positions, a holding device for each signal arm including a latch member, a push rod controlling the latch member and a spring yieldably maintaining the latch member in engagement with a signal arm, and a crank controlled yoke common to the several signal arms for returning the arms from their operative positions into engagement with the respective holding means.

5. An automobile signal comprising a casing, a cross bar in the lower portion of the casing, a signal arm pivotally mounted off center at its lower end upon the cross bar and capable of gravitating from an upright housed position to an operative position, a substantially horizontal pivoted latch normally engaging the signal arm, a substantially horizontal push rod movable endwise through one of the walls of the casing and associated with the latch for controlling the same, and a coiled spring embracing the push rod and yieldably opposing endwise movement thereof.

6. An automobile signal comprising a casing, a cross bar in the lower portion of the casing, a signal arm pivotally mounted off center at its lower end upon the cross bar and capable of gravitating from an upright housed position to an operative position, a substantially horizontal pivoted latch normally engaging the signal arm, a substantially horizontal push rod movable endwise through one of the walls of the casing and associated with the latch for controlling the same, and a coiled spring embracing the push rod and yieldably opposing endwise movement thereof, a rock bar disposed parallel with the cross bar and having an operating crank handle, and a yoke carried by the rock bar and underlying the signal arm in its operative position for returning the signal arm to its normal position, the side arms of the yoke being in the form of elbows to engage the cross bar and limit the downward movement of the yoke.

7. An automobile signal comprising a casing provided in its front with a plurality of upright slots, a cross bar mounted within the lower portion of the casing, signal arms pivoted off center upon the cross bar and adapted to gravitate through the respective slots in the casing into operative positions, independent holding devices for holding the signal arms in their upright positions and located one above the other, each holding means including a cross bar, a substantially horizontal latch pivoted on the cross bar and having a shoulder engaging the adjacent signal arm, a push rod working through one wall of the casing, a pivotal connection between the latch and the push rod, a spring yieldably maintaining the push rod at one limit thereof, a rock bar within the lower portion of the casing and provided with an operating handle and a yoke carried by the rock bar and having its cross head underlying the signal arms in their operative positions, the cross bar constituting a stop to limit the downward movement of the yoke.

JOHN F. ARCHER.